(12) United States Patent
Garey

(10) Patent No.: US 6,768,914 B1
(45) Date of Patent: Jul. 27, 2004

(54) FULL-DUPLEX SPEAKERPHONE WITH WIRELESS MICROPHONE

(75) Inventor: Kenneth E. Garey, Irvine, CA (US)

(73) Assignee: Skyworks Solutions, Inc., Newport Beach, CA (US)

( * ) Notice: Subject to any disclaimer, the term of this patent is extended or adjusted under 35 U.S.C. 154(b) by 0 days.

(21) Appl. No.: 09/144,842

(22) Filed: Aug. 31, 1998

(51) Int. Cl.⁷ ............................................... H04M 1/00
(52) U.S. Cl. .................... 455/569.1; 455/570
(58) Field of Search ........................... 455/569.1, 570, 455/462, 550.1, 575, 517, 414, 416; 379/420.01, 432, 388, 410, 391, 389, 406–409, 431, 202; 375/219, 222, 244, 242, 246, 249, 254; 370/286, 289

(56) References Cited

U.S. PATENT DOCUMENTS 4,053,717 A * 10/1977 Snider ........................ 455/462
5,138,651 A * 8/1992 Sudo ........................... 455/462
5,664,015 A * 9/1997 Ford et al. ................... 379/433

* cited by examiner

Primary Examiner—Erika Gary
(74) Attorney, Agent, or Firm—Christopher J. Rourk; Akin Gump Strauss Hauer & Feld, LLP

(57) ABSTRACT

A full-duplex speakerphone that is coupled to a network such as the public switched telephone network. The full-duplex speakerphone includes a base station, which has a network connection and receives a network signal from the network. The base station also includes a speaker for audibly outputting a signal derived from the network signal into a room in which the speakerphone is located. The base station also includes a wireless receiver for receiving signals transmitted over the air from a wireless remote microphone equipped with a wireless transmitter, the received signals being sent by the base station over the network.

9 Claims, 6 Drawing Sheets

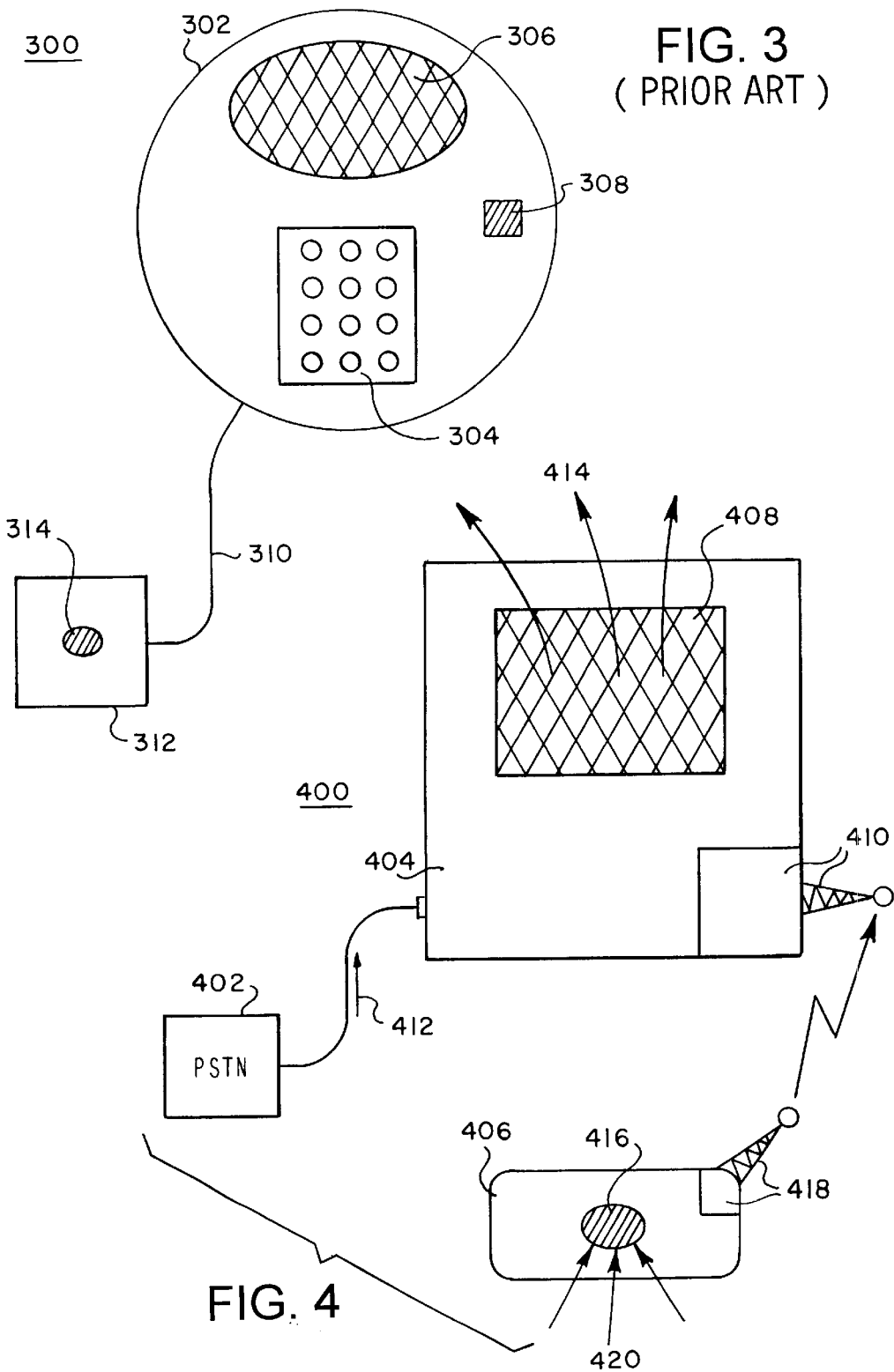

FULL-DUPLEX SPEAKERPHONE WITH WIRELESS MICROPHONE

BACKGROUND OF THE INVENTION

1. Field of the Invention

The present invention relates to telephony. More particularly, the present invention relates to speakerphones that have a wireless connection to their microphone.

2. Description of Related Art

Telephones equipped with a loud speaker and microphone ("speakerphones") allow one or more talkers in a room with the speakerphone to participate in a telephone conversation without using their hands. Freeing the hands during telephone conversations has many advantages, including facilitating note-taking, decreasing neck, arm, and shoulder fatigue, and allowing the talker to freely move about the room.

Speakerphones may be designed to operate in either half-duplex or full-duplex mode. In the half-duplex mode, when conducting a telephone call using a speakerphone, only one party involved in the telephone call can have his voice transmitted at one time. If both parties try to speak simultaneously, a choppy sound effect known as clipping results. Having to speak in turn can be unnatural and can make conversation difficult and laborious. Thus, many speakerphones are designed to operate in full-duplex mode. The full-duplex mode allows incoming and outgoing parties' voices to be simultaneously transmitted so that there is no clipping or choppyness. This results in much more natural and spontaneous flowing conversation. Full-duplex is even more important when more than one person is in a room using the speakerphone for a conference call. It can be difficult for the person on the other end of the conference call, connected via the telephone network, to break into the ongoing conversation. In addition, noise or commentary in the conference room can cut off the person on the other end.

FIG. 1 shows a conventional full-duplex speakerphone 100. The speakerphone 100 includes a base station 102 and a handset 104 that is connected to the base station 102 by a cable 105. The base station 102 includes a keypad 106, a speaker 108, and a microphone 110. A person using the speakerphone 100 can conduct a telephonic conversation with another person by using the handset 104 to speak and hear, or by using the speaker 108 to hear the other person and the microphone 110 to speak.

However, conventional full-duplex speakerphones like the one shown in FIG. 1 operate under severe constraints that adversely effect the audio quality of the telephonic conversation. The speaker 108 and microphone 110 are both located in the base station 102, in close proximity to one another. The close proximity results in acoustic coupling between the speaker 108 and microphone 110 by which sound emanating from the speaker 108 is picked-up by the microphone 110. This causes an echo signal to be transmitted by the speakerphone 100 to a listener connected to the speakerphone 100 over the telephone network.

This effect becomes more pronounced when the room talker is much farther from the microphone 110 than the speaker 108. The microphone 110 receives the speaker 108 signal as a very loud signal, while the voice of the distant room talker is received by the microphone 110 as a very quiet signal. Moreover, the room talker's voice will typically echo as a result of impedance mismatches in the telephone network, from the point where the speakerphone 100 is connected to the telephone network to the termination at a central office of the telephone service provider. To mitigate these echoes, full-duplex speakerphones have echo cancelers. While echo cancelers can reduce the echo, they do not fully cancel the echo, leaving residual echos. When the residual echoes are audible, this significantly degrades the quality of a conversation.

In addition, full-duplex speakerphones like that illustrated in FIG. 1 tend to pick-up substantial amounts of unwanted noise. With the microphone 108 fixed in the base station 102, the person talking may be a significant distance from the microphone 108. The farther away the talker is from the microphone 108, the more difficult it becomes to hear the talker's voice. To make the talker audible, the microphone signal must be amplified. But this also amplifies the system background noise, which includes the residual echo, quantization noise in digital systems, environmental background noise, and the noise floor of the microphone 108. The more noise the microphone 108 picks-up, the greater the degradation in sound quality during the call.

FIG. 2 shows a full-duplex speakerphone 200 that is designed to reduce the acoustic coupling problem. The speakerphone 200 includes a speaker 202 and microphone 204. The speakerphone 200 has a line side 206, which is connected on one end to the public switched telephone network (PSTN) 208, and a room side 210. The speakerphone 200 also has a transmit signal path 212 and a receive signal path 214. A line echo canceler (LEC) 216 is located between the transmit signal path 212 and receive signal path 214 on the line side 206, and an acoustic echo canceler (AEC) 218 is located between the transmit path 212 and receive path 214 on the room side 210.

A line talker signal 220 incoming to the speakerphone 200 from the PSTN 208 is converted from analog to digital form, and any line echo 221 excited by the LEC reference input signal ($LEC_{ref}$) 222 that is estimated by the LEC 216 is subtracted from the LEC echo input signal ($LEC_{echo}$) 224. A residual line signal 226, which ideally contains only the line talker signal 220, is then amplified by the receive automatic gain control (AGC) 228, which is designed to maintain its output power at a specified level. The receive AGC 228 outputs a signal that is converted into an analog form and output to the speaker 202, completing the receive signal path 214.

Similarly, in the transmit direction, the microphone 204 picks-up a room talker signal 232, which is converted into an AEC echo input signal ($AEC_{echo}$) 234. The room echo 236, as estimated by the AEC 218, is then subtracted from the $AEC_{echo}$ signal 234, and the residual transmit signal 238, which ideally contains only the room talker signal 232, is amplified by the transmit AGC 240 to a specified level. The amplified signal is then converted to analog and output to the PSTN 208, completing the transmit signal path 212.

In practice, however, the AEC 218 and LEC 216 do not provide perfect cancellation, and the transmit and receive signals leak into one another. As a result, a potential loop exists in the signal path, shown by gain loop 242. The AGCs 228, 240 and other analog or digital gains may, at some frequencies, cause gain around the loop 242 to be greater than unity, especially if the standard deviations of the input line 244 and/or room talker signal 232 are small, and the gains of the AGCs 228, 240 are high. When the loop gain 242 is greater than unity at any frequency, the full-duplex speakerphone 200 is prone to oscillate or feed-back.

To correct these problems, expensive circuitry and software must be designed and provided in the full-duplex speakerphone 200. Even with the added circuitry and software, the speakerphone 200 may experience feedback due to the close proximity of the speaker 202 and microphone 204 and resultant acoustic coupling between them.

FIG. 3 shows another type of speakerphone 300 that is designed to provide a reduction in acoustic coupling and feedback. The speakerphone 300 has a base station 302, keypad 304, speaker 306, and base station microphone 308. Speakerphone 300 also includes a remote microphone housing 312, which is connected to the base station 302 by a cable 310. The remote microphone housing 312 has a remote microphone 314. Locating the remote microphone 314 remote from the speaker 306 reduces coupling between the remote microphone 314 and speaker 306.

The use of cable 310 to connect the remote microphone housing 312 to the base station 302, however, limits the flexibility of the speakerphone 300. Cable 310 physically limits where the remote microphone 314 can be located relative to the base station 302 and talker. If the talker were to try to relocate the microphone housing 312 around the room to reduce the background noise problem, the cable 310 would physically limit the talker's mobility and could also become entangled with furniture and other persons present in the room.

Accordingly, a need exists for an inexpensive speakerphone that reduces background noise, reduces acoustic coupling and resultant feedback, and provides flexibility and ease of use. The present invention provides such a speakerphone.

SUMMARY

The present invention is a full-duplex speakerphone that is coupled to a network. As used herein, the network may be any type of network that is capable of carrying a telephony signal, including the public switched telephone network (PSTN), a private telephone network, a cellular telephone network, a paging network, or a computer network such as the Internet. These exemplary networks are not to be considered limiting, however, as the speakerphone of the present invention may be designed to work with any telephonic or computer network or system.

In a first embodiment, the invention is a full-duplex speakerphone that is coupled to a network. The speakerphone includes a base station having a network connection, a speaker, and a wireless receiver. The base station receives a first network signal from the network, and the speaker delivers an audible signal derived from the first network signal. The speakerphone also includes a wireless remote microphone apparatus having a microphone and a wireless transmitter. The microphone receives an audio signal, and the wireless transmitter transmits the audio signal over the air to the wireless receiver in the base station. The base station converts the audio signal into a second network signal and sends the second network signal to the network. The base station and wireless remote microphone apparatus operate in full-duplex mode.

In a second embodiment, the present invention is a full-duplex speakerphone that is coupled to a network. As in the preceding embodiment, this second embodiment includes a base station and a wireless remote microphone that operate in full-duplex.

The base station of the second embodiment includes a network connection, a speaker, a wireless receiver, a first signal converter coupled to the network, a line echo canceler coupled to the first signal converter, a compressor coupled to the line echo canceler, a decompressor coupled to the compressor, a second signal converter coupled to the compressor and the speaker, and a wireless transmitter coupled to the compressor. The first signal converter converts an analog line signal received from the network into a digital line signal, and the line echo canceler reduces an echo component of the digital line signal to obtain a residual digital line signal. The compressor compresses the residual digital line signal into a compressed digital line signal, and the decompressor decompresses the compressed residual digital line signal into a decompressed digital line signal. The second signal converter converts the decompressed digital line signal into a speaker signal, and the speaker audibly outputs the speaker signal. The wireless transmitter sends a transmit signal derived from the compressed digital line signal over the air to the wireless remote microphone apparatus to be used as a reference signal.

The wireless remote microphone of the second embodiment has a microphone and a wireless transmitter. The microphone receives an audio signal, and the wireless transmitter transmits the audio signal over the air to the wireless receiver in the base station, the base station converting the audio signal into a network signal and sending the network signal to the network.

In a third embodiment, the invention is a full-duplex speakerphone that is coupled to a network. The speakerphone includes a base station and a wireless remote microphone that operate in full-duplex mode.

The base station of the third embodiment includes a speaker, a wireless receiver, a first signal converter coupled to the network, a line echo canceler coupled to the first signal converter, an acoustic echo canceler coupled to the line echo canceler and to the wireless receiver, and a second signal converter coupled to the acoustic echo canceler and to the speaker. The first signal converter converts an analog line signal received from the network into a digital line signal, and the line echo canceler reduces an echo component of the digital line signal to obtain a residual digital line signal. The second signal converter converts the residual digital line signal into a speaker signal, and the speaker audibly outputs the speaker signal.

The wireless remote microphone of the third embodiment includes a microphone and a wireless transmitter. The microphone receives an audio signal, and the wireless transmitter transmits the audio signal over the air to the wireless receiver in the base station. The acoustic echo canceler reduces an echo component of the audio signal to obtain a residual audio signal, and the base station converts the residual audio signal into a network signal and sends the network signal to the network.

The details of the preferred embodiment in the present invention are set forth in the accompanying drawings and the description below. Once the details of the invention are known, numerous additional innovations and modifications will become obvious to one skilled in the art.

DESCRIPTION OF DRAWINGS

FIG. 3 is a top view of another prior art speakerphone in which a base station houses the speaker, and the microphone is in a remote unit connected to the base station by a cable.

FIG. 4 is a block diagram of an exemplary embodiment of the speakerphone of the present invention.

Like reference numbers and designations in the various drawings indicate like elements.

DETAILED DESCRIPTION

Figure 1:
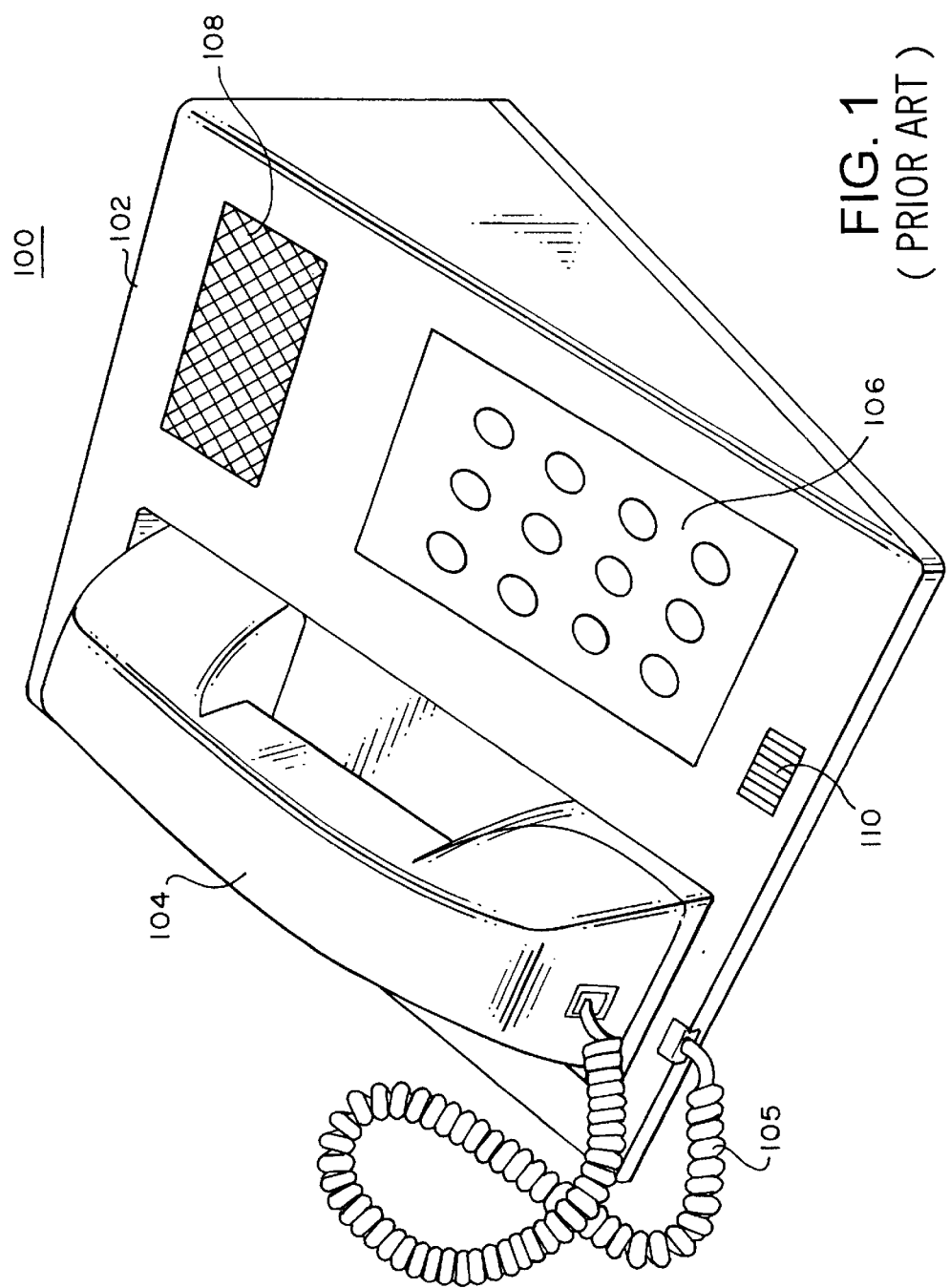
FIG. 1 is is a perspective view of a prior art speakerphone in which the speaker and microphone are located in the same base unit.
Figure 2:
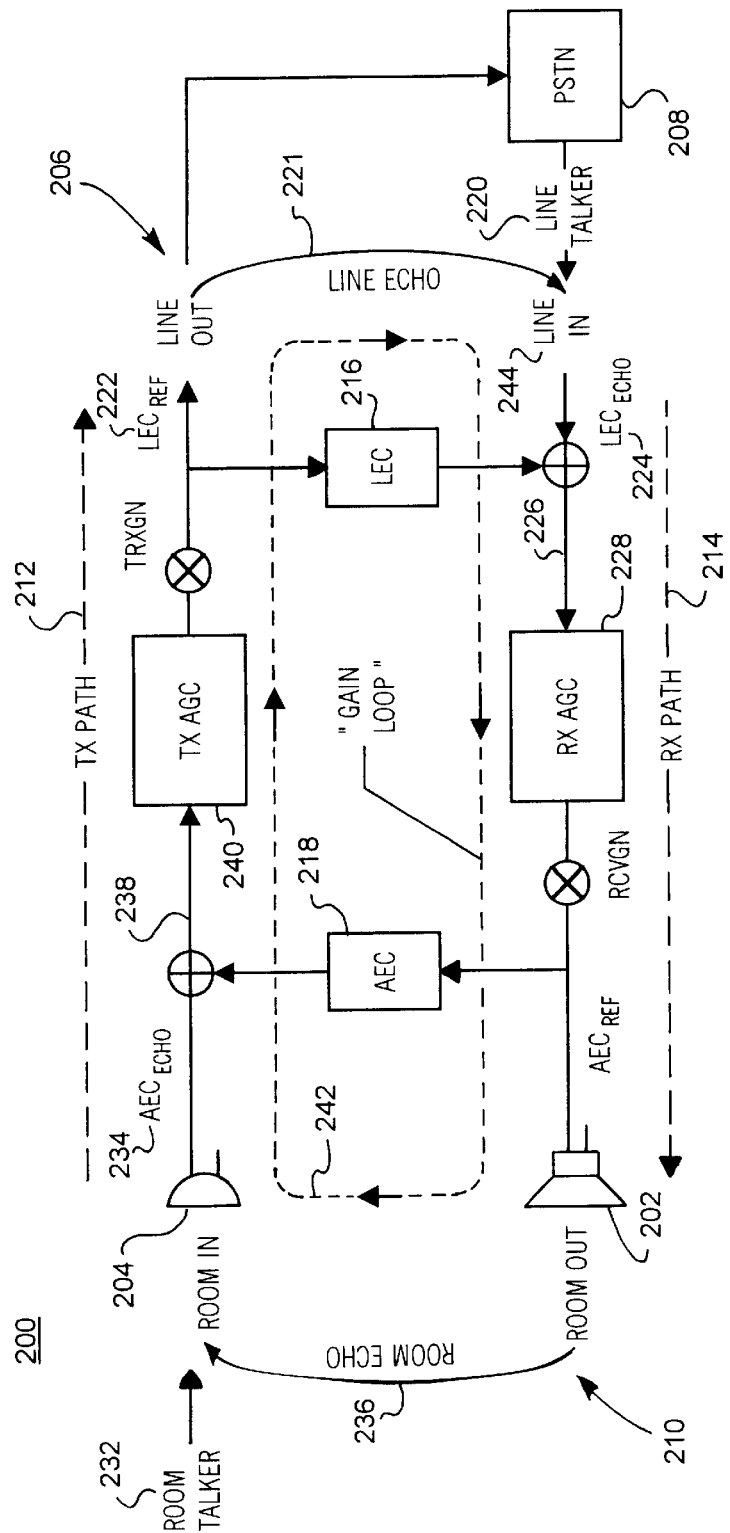
FIG. 2 is a block diagram of another prior art speakerphone having components for reducing echo effects.

Throughout this description, the preferred embodiment and examples shown should be considered as exemplars, rather than as limitations on the present invention.

FIG. 4 shows an exemplary embodiment of a full-duplex speakerphone 400 of the present invention. The speakerphone 400 is coupled to a telephone network 402. Generally, the telephone network 402 is the public switched telephone network (PSTN), but, as noted above, such a connection is not to be considered limiting. The speakerphone 400 may be coupled to a private telephone network, to a cellular network, to the Internet, or to any other type of telephonic or computer network that is a capable of carrying telephony signals.

The speakerphone 400 includes a base station 404 and a wireless remote microphone 406, both of which are used to operate in full-duplex. The base station 404 includes a speaker 408 and a wireless receiver 410. The base station receives a line signal 412 from the network 402, and the speaker 408 delivers an audible signal 414 derived from the line signal 412, such that the audible signal 414 can be easily heard in a room in which the speakerphone 400 is placed. The wireless remote microphone 406 has a microphone 416 and a wireless transmitter 418. The microphone 416 receives an audio signal 420 from the room, and the wireless transmitter 418 transmits the audio signal 420 over the air to the wireless receiver 410. The base station 404 outputs the audio signal received by the wireless receiver 410 to the telephone network 402.

Preferably, the wireless remote microphone apparatus 406 is portable and can be easily carried around the room by a person. For example, the wireless remote microphone apparatus 406 may be sufficiently small in size and weight so as to be worn by a person attached to his or her clothing, like a clip-on microphone, or to be carried in a person's shirt pocket, in known fashion. The wireless remote microphone apparatus 406 may also be sized and shaped so it could placed safely on most surfaces. In any of these configurations, the wireless remote microphone 406 can be carried around the room by a person and located in a position to minimize the distance between the person and the microphone 416 in order to prevent the microphone 416 from picking-up significant background noise, a problem that becomes more acute as the distance between the person talking and the microphone 416 increases. Also, the microphone apparatus 406 may be self-powered (e.g., by a battery or other power source) to allow the apparatus 406 to be easily relocated and moved.

Figure 5:
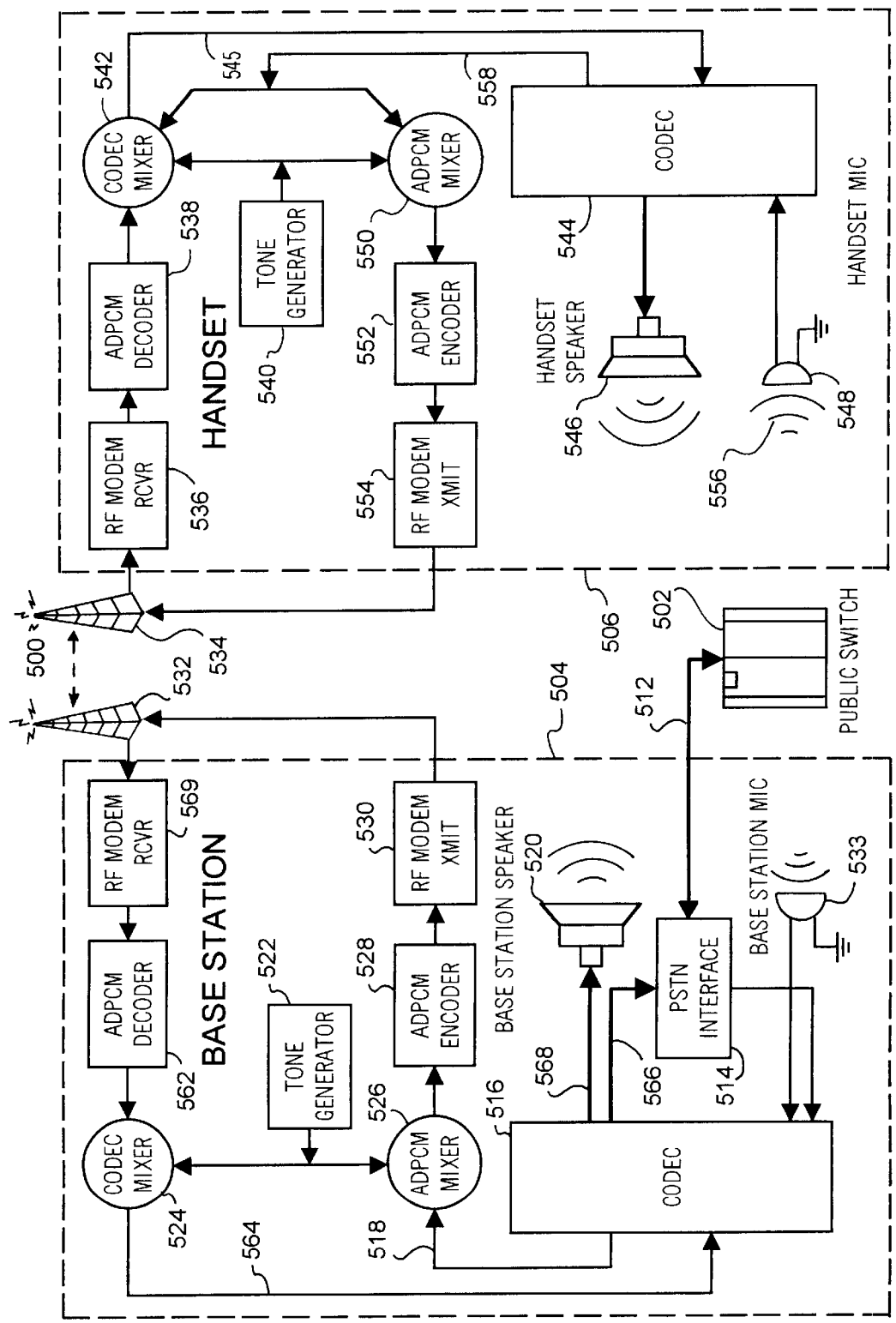
FIG. 5 is a block circuit diagram of an exemplary embodiment of a cordless telephone that can be adapted to be used as an embodiment of the speakerphone of FIG. 4.

FIG. 5 is a block diagram of a cordless telephone 500 that may be adapted to implement the present invention. The cordless telephone 500 is preferably placed in a room and, for example, may be coupled to the PSTN 502, as shown. The cordless telephone 500 includes a base station 504 and a wireless handset apparatus 506.

The base station 504 receives an analog line signal 512 from the PSTN 502. A PSTN interface circuit element 514 then extracts the line signal 512 from the 2-wire interface of the telephone network 502 while the interface circuit element 514 sends transmitted signal from the base station 504 to the telephone network 502. A coder/decoder (codec) 516 then receives the extracted analog line signal from the interface circuit element 514 and converts that signal into a digital line signal 518. The codec 516 also drives a speaker 520.

The base station 504 includes a tone generator 522, a codec mixer 524, an Adaptive Differential Pulse Coded Modulation (ADPCM) mixer 526, a compression encoder 528, and a radio frequency (RF) modem transmitter 530. As shown, the signal compression encoder 528 preferably uses an ADPCM algorithm to compress the signal. As those skilled in the art will recognize, ADPCM is a high quality speech compression algorithm commonly used to reduce the cost of long distance telephone calls. The tone generator 522 is used for dialing telephone numbers (e.g., by producing dual-tone multi-frequency (DTMF) tones) and is coupled to both the codec mixer 524 and the ADPCM mixer 526. As a result, any tones output by the tone generator 522 can be mixed with the digital line signal 518 by the ADPCM mixer 526 and output to the ADPCM encoder 528, which compresses the mixed digital signal using the ADPCM algorithm. Of course, if no digital line signal 518 is present, the ADPCM mixer 526 can nevertheless pass tones generated by the tone generator 522 to the ADPCM encoder 528, and vice versa. The compressed signal is then processed by the RF modem transmitter 530, which converts the compressed signal to analog. The analog compressed signal is then transmitted over the air by a transducer 532, which is coupled to the RF modem transmitter 530. Performing ADPCM encoding and thus compression of the line signal before over the air transmission is advantageous, as it reduces time and bandwidth required for transmission.

The wireless handset 506 includes a transducer 534, an RF modem receiver 536, an ADPCM decoder 538, a tone generator 540, a codec mixer 542, a codec 544, and a speaker 546. Portions of this signal path, which is typically used to audibly output signals received from the PSTN 502, may be omitted from the wireless handset 506 or may be disabled, if present in a speakerphone application. The transducer 534 receives the analog compressed signal that is transmitted over the air by transducer 532, which is passed to the RF modem receiver 536 for conversion from analog to digital. The digital compressed signal is then output by the RF modem receiver 536 to the ADPCM decoder 538, which decompresses the compressed digital signal using the ADPCM algorithm. The codec mixer 542, which is coupled to the tone generator 540, receives the decompressed digital signal that has been processed by the ADPCM decoder 538 and, if the tone generator 540 is being used to generate telephone touch tones, mixes any such tones with the decompressed digital signal. The mixed digital signal is then output to the codec 544, which converts the mixed signal from digital to analog, and a resultant analog signal is audibly produced by the speaker 546.

The wireless handset 506 also includes a microphone 548, an ADPCM mixer 550, an ADPCM encoder 552, and an RF modem transmitter 554. The microphone 548 receives an audio signal 556. The audio signal 556 will generally be a person's voice, but it may be music or any other audible sounds. The audio signal 556 is then converted into digital format by the codec 544 to obtain a digital room signal 558, which can be mixed by the ADPCM mixer 550 with any tones being generated by the tone generator 540. The mixed digital room signal is then ADPCM compressed by the ADPCM encoder 552 and converted from digital to analog by the RF modem transmitter 554. The transducer 534 transmits the compressed analog room signal over the air to the transducer 532 and an RF modem receiver 569 in the base station 504. The modem receiver 569 converts the compressed analog room signal that is received by the modem receiver 569 into a digital compressed signal, and an ADPCM decoder 562 in the base station 504 decompresses the signal using the ADPCM algorithm. The codec mixer 524 may then mix the decompressed room signal with any tones produced by the tone generator 522, generating a digital transmit signal 564. Codec 516 converts the digital transmit signal 564 into an analog transmit signal 566, which is transmitted to the network by the PSTN interface 514.

The base station 504 may optionally include a base station microphone 533. Microphone 533 can be used if the cordless telephone 500 is being used in conjunction with the wireless handset 506 as an intercom. The analog signal generated by the microphone 533 replaces the line signal generated by the PSTN interface 514. In addition the digital transmit signal 564 is converted into speaker output signal 568, which speaker 520 makes into an audible signal that can be heard in the room where base station 504 resides.

Figure 6:
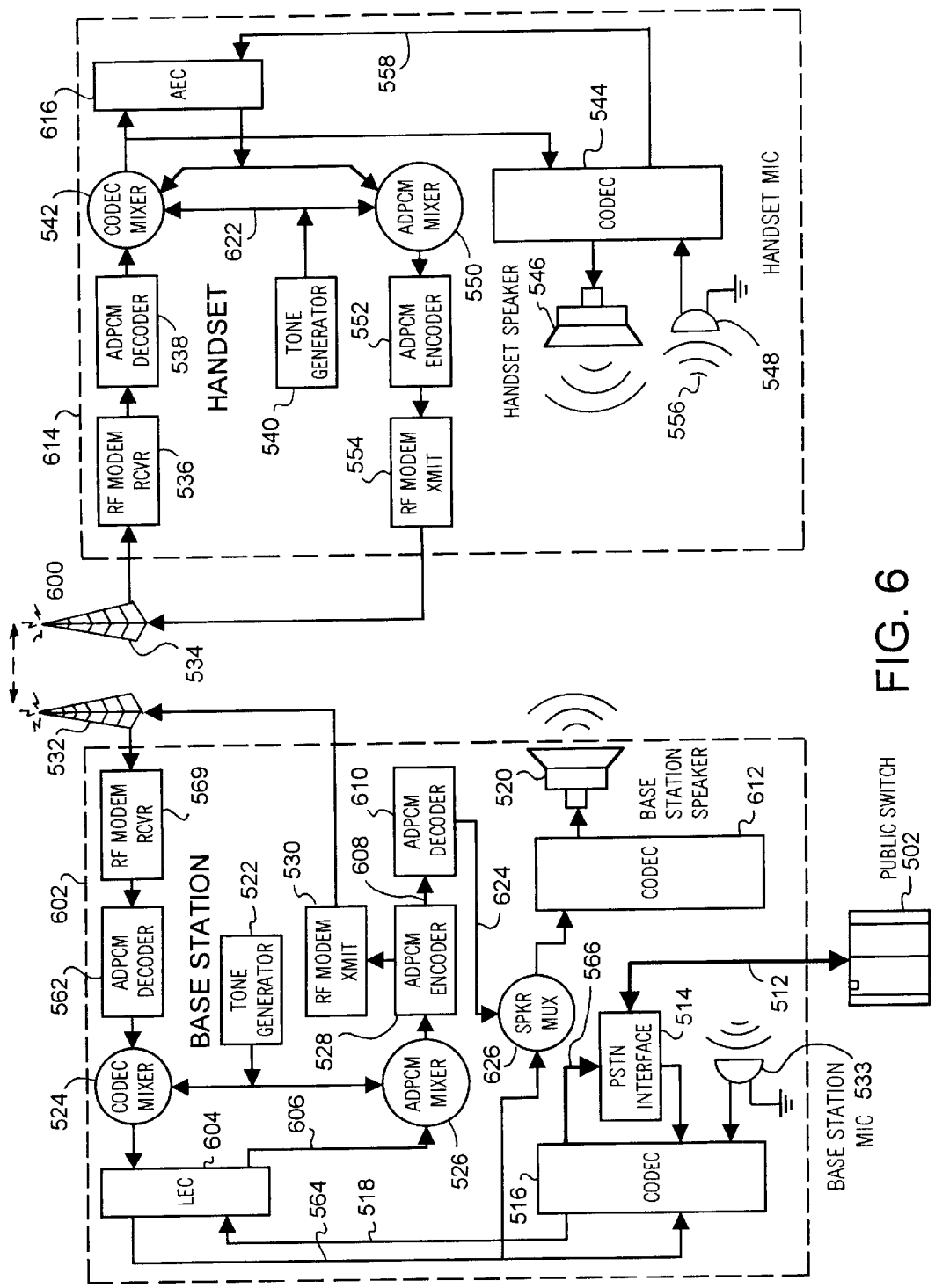
FIG. 6 is a block circuit diagram of an exemplary embodiment of the speakerphone of FIG. 4.

FIG. 6 is a block diagram of an embodiment of a full-duplex speakerphone 600 in accordance with the invention. In many aspects, this embodiment 600 is identical to the cordless telephone 500. Where the two embodiments are identical, the same reference numerals are used for both.

Speakerphone 600 also differs in several respects from cordless telephone 500. First, the base station 602 of speakerphone 600 includes a line echo canceler (LEC) 604 between codec 516 and the codec mixer 524 and ADPCM mixer 526. The LEC 604 functions to reduce echo that may be present in the unprocessed digital line signal 518 output by the codec 516, producing a digital line signal 606. The digital line signal 606 is then passed through the ADPCM encoder 528 and RF modem transmitter 530 and transmitted over the air to the wireless remote microphone 614 ("HAND SET"). Unlike cordless phone 500, however, before being audibly output by the base station speaker 520, the ADPCM compressed line signal 608 is decompressed by an ADPCM decoder 610 to make a digital speaker output signal 624. Then, output signal 624 is passed through SPKR MUX 626 before being converted from digital to analog by another codec 612, which is coupled to the base station speaker 520.

The wireless remote microphone 614 of speakerphone 600 includes an acoustic echo canceler (AEC) 616. The AEC 616 receives the unprocessed digital room signal 558 from codec 544 and reduces echo from digital room signal 558 to obtain a digital room signal 622. This signal 622 is processed by the ADPCM encoder 552 and the RF modem transmitter 554 and is then sent over the air to the base station 602.

Accordingly, the digital line signal 518 is ADPCM encoded and then decoded before it is converted into an analog signal and played into the room by the speaker 520. This signal 518 is also transmitted over the wireless link 532, 534 to be used as a reference signal by the AEC 616. The AEC 616 uses this reference signal to calculate an estimate of the room echo in the signal received by the microphone 548. The AEC 616 also subtracts this echo estimate from signal 558, which is then sent back to the base station 602. This improves the performance of the AEC 616, due to the fact that the AEC 616 can only receive an ADPCM compressed and then decompressed signal as a reference signal for the echo cancellation process.

Speakerphone 600 is still optionally capable of performing as a cordless telephone or intercom. All the cordless telephone paths have been left in the system. Also remaining is the signal path that supports connecting base microphone 533, through the wireless link to the wireless remote microphone 614 for intercom mode. SPKR MUX 626 has been added to provide a path to connect the digital transmit signal 564 to codec 612, which drives the base station speaker 520.

Figure 7:
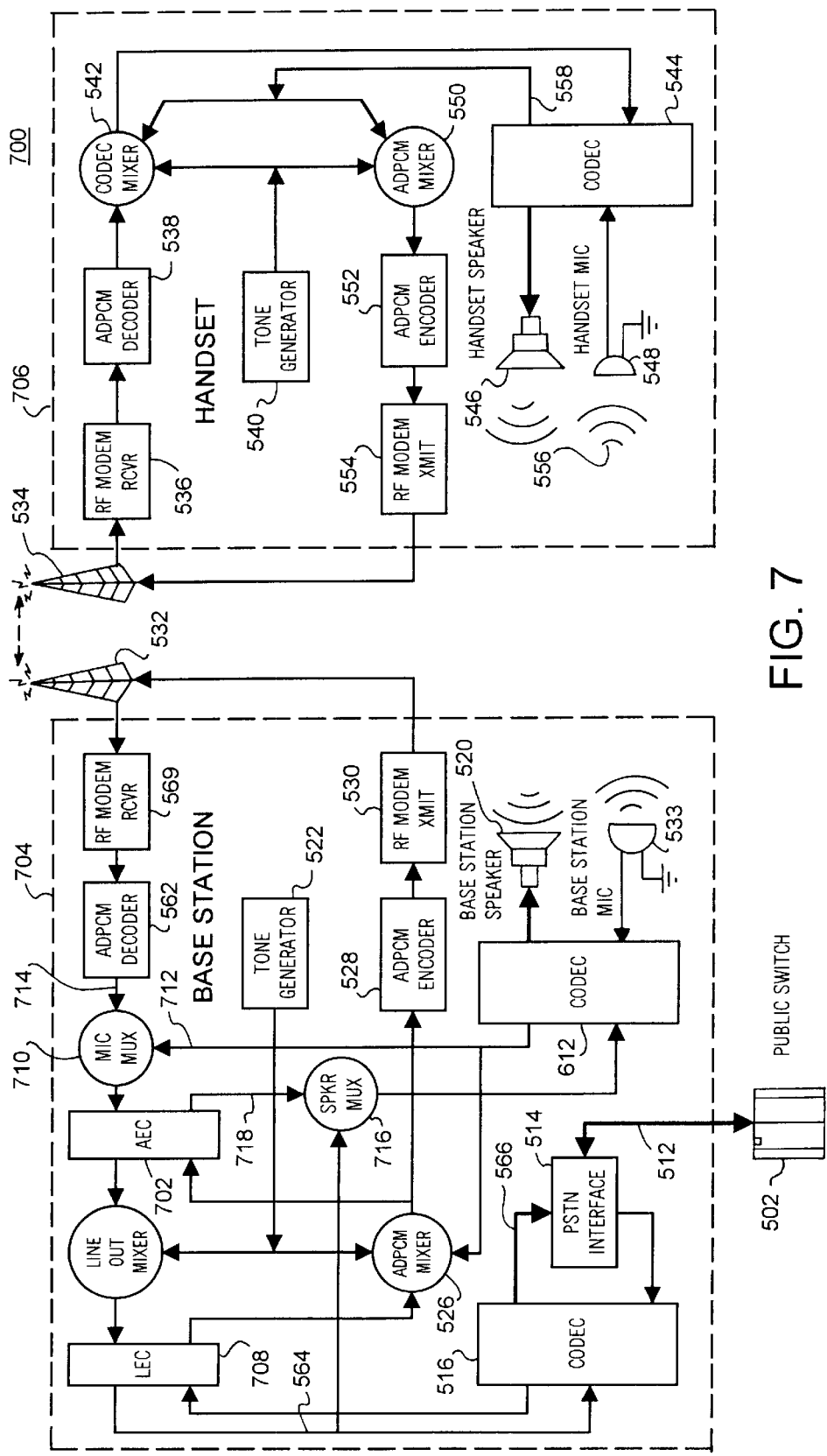
FIG. 7 is a block circuit diagram of an alternative embodiment of the speakerphone of FIG. 4.

FIG. 7 is a block diagram of another embodiment of the speakerphone 700 of the present invention. This embodiment is similar to speakerphone 600, but differs in that an AEC 702 is placed in the base station 704 rather than the wireless remote microphone 706. This speakerphone 700 has the advantage of keeping all the computational equipment (i.e. LEC 708 and AEC 702) in the base station 704. This means that the LEC 708 and AEC 702 can be easily powered from a wall plug, rather than powering the AEC 702 from a battery in the wireless remote microphone 706. On the other hand, due to placement of the AEC 702 in the base station 704, speakerphone 700 suffers from ADPCM distortion that is introduced by the wireless remote microphone 706.

In addition, speakerphone 700 has a microphone multiplexer 710, which allows the base station 704 to act as a complete speakerphone, independent of the wireless remote microphone 706. In this configuration, the microphone multiplexer 710 can select between two paths: (1) path 712 direct from the codec 612, or (2) path 714, which comes directly from the receive ADPCM decoder 562. Thus, when the wireless remote microphone 706 is not being used, the microphone multiplexer 710 can select path 712 to get the digital microphone signal directly from codec 612.

As in speakerphone 600, speakerphone 700 still provides cordless telephone and intercom capabilities. The cordless phone paths are unchanged. To support intercom, SPKR MUX 716 has been added. SPKR MUX 716 selects between the output 718 of the AEC 702 and the digital transmit signal 564. In speakerphone mode, the AEC output 718 is passed to codec 612 then on to the speaker 520 to provide the speakerphone room audio signal. In intercom mode, digital transmit signal 564 is passed to codec 612 and then into the room.

Several embodiments of the present invention have been described. Nevertheless, it will be understood that various modifications may be made without departing from the spirit and scope of the invention. For example, the base station can be equipped with or without a microphone. Similarly, the wireless remote microphone can be equipped with its own speaker, or this part can be omitted. Alternatively, the microphone may include its own speaker, which can be activated or disabled by a user. Accordingly, it is to be understood that the invention is not to be limited by the specific illustrated embodiment, but only by the scope of the appended claims.

What is claimed is:

1. A full-duplex speakerphone that is coupled to a network, comprising:

a. A base station including a network connection, a speaker, a wireless receiver, a first signal converter coupled to the network, a line echo canceler coupled to the first signal converter, a compressor coupled to the line echo canceler, a decompressor coupled to the compressor, a second signal converter coupled to the decompressor and the speaker, and a wireless transmitter coupled to the compressor; and wherein:

(1) the first signal converter is for converting an analog line signal received from the network into a digital line signal, (2) the line echo canceler is for reducing an echo component of the digital line signal to obtain a residual digital line signal, (3) the compressor is for compressing the residual digital line signal into a compressed residual digital line signal, (4) the decompressor is for decompressing the compressed residual digital line signal into a decompressed digital line signal, (5) the second signal converter is for converting the decompressed digital line signal into a speaker signal, (6) the speaker is for audibly outputting the speaker signal, and (7) the wireless transmitter is for sending a transmit signal derived from the compressed residual digital line signal over the air to the wireless remote microphone apparatus to be used as a reference signal; and b. a wireless remote microphone apparatus having a microphone and a wireless transmitter, the microphone for receiving an audio signal, and the wireless transmitter for transmitting the audio signal over the air to the wireless receiver in the base station, the base station converting the audio signal into a network signal and sending the network signal to the network, the base station and wireless remote microphone apparatus operating in full-duplex mode.

2. The full-duplex speakerphone of claim 1 wherein the compressor and the decompressor compress and decompress, respectively, using an adaptive differential pulse coded modulation (ADPCM) algorithm.

3. The full-duplex speakerphone of claim 1 wherein the base station further includes an adaptive differential pulse coded modulation (ADPCM) compression decoder, coupled to the wireless receiver and the line echo canceler, for decoding the audio signal into a decompressed audio signal and for outputting the decompressed audio signal to the line echo canceler.

4. The full-duplex speakerphone of claim 1 wherein the microphone receives an analog room signal; wherein the wireless remote microphone apparatus further includes a third signal converter coupled to the microphone, an acoustic echo canceler coupled to the third signal converter, a second compressor coupled to the acoustic echo canceler and the wireless transmitter, a second wireless receiver coupled to the acoustic echo canceler, and a decompressor coupled to the second wireless receiver and to the acoustic echo canceler; and wherein:

a. the third signal converter is for converting the analog room signal into a digital room signal;

b. the second wireless receiver is for receiving the reference signal from the wireless transmitter;

c. the decompressor is for decompressing the reference signal into a decompressed reference signal;

d. the acoustic echo canceler is for reducing an echo component of the digital room signal to obtain a residual digital room signal by subtracting a signal derived from the decompressed reference signal from the digital room signal;

e. the second compressor is for compressing the residual digital room signal into a compressed digital room signal; and f. the wireless transmitter is for converting the compressed digital room signal into a compressed analog room signal and for transmitting the compressed analog room signal over the air to the wireless receiver.

5. A full-duplex speakerphone that is coupled to a network, comprising:

a. a base station including a speaker, a wireless receiver, a first signal converter coupled to the network, a line echo canceler coupled to the first signal converter, an acoustic echo canceler coupled to the line echo canceler and to the wireless receiver, a second signal converter coupled to the acoustic echo canceler and to the speaker; and wherein:

(1) the first signal converter is for converting an analog line signal received from the network into a digital line signal, (2) the line echo canceler is for reducing an echo component of the digital line signal to obtain a residual digital line signal, (3) the second signal converter is for converting the residual digital line signal into a speaker signal, and (4) the speaker is for audibly outputting the speaker signal; and b. a wireless remote microphone apparatus having a microphone and a wireless transmitter, the microphone for receiving an audio signal, and the wireless transmitter for transmitting the audio signal over the air to the wireless receiver in the base station, the acoustic echo canceler reducing an echo component of the audio signal to obtain a residual audio signal, and the base station converting the residual audio signal into a network signal and sending the network signal to the network, the base station and wireless remote microphone apparatus operating in full-duplex mode.

6. The full-duplex speakerphone of claim 5 wherein the base station and the wireless remote microphone apparatus can operate together as an intercom.

7. The full-duplex speakerphone of claim 6 wherein the wireless microphone remote apparatus further includes a third signal converter coupled to the microphone, and a compressor coupled to the third signal converter; wherein base station further includes a decompressor coupled to the wireless receiver and to the acoustic echo canceler; and wherein:

a. the third signal converter is for converting the audio signal into a digital audio signal;

b. the compressor is for compressing the digital audio signal into a compressed audio digital signal;

c. the wireless transmitter is for converting the compressed audio digital signal into a compressed analog audio signal;

d. the wireless receiver is for receiving the compressed analog audio signal and converting the compressed analog audio signal into a compressed received digital signal; and e. the decompressor is for decompressing the compressed received digital signal into an uncompressed received digital signal.

8. The full-duplex speakerphone of claim 7 wherein the compressor and the decompressor compress and decompress, respectively, using an adaptive differential pulse coded modulation (ADPCM) algorithm.

9. The full-duplex speakerphone of claim 5 wherein the wireless microphone apparatus can operate as a wireless telephone handset for sending signals via the base station to the network and receiving signals via the base station from the network.

* * * * *